UNITED STATES PATENT OFFICE.

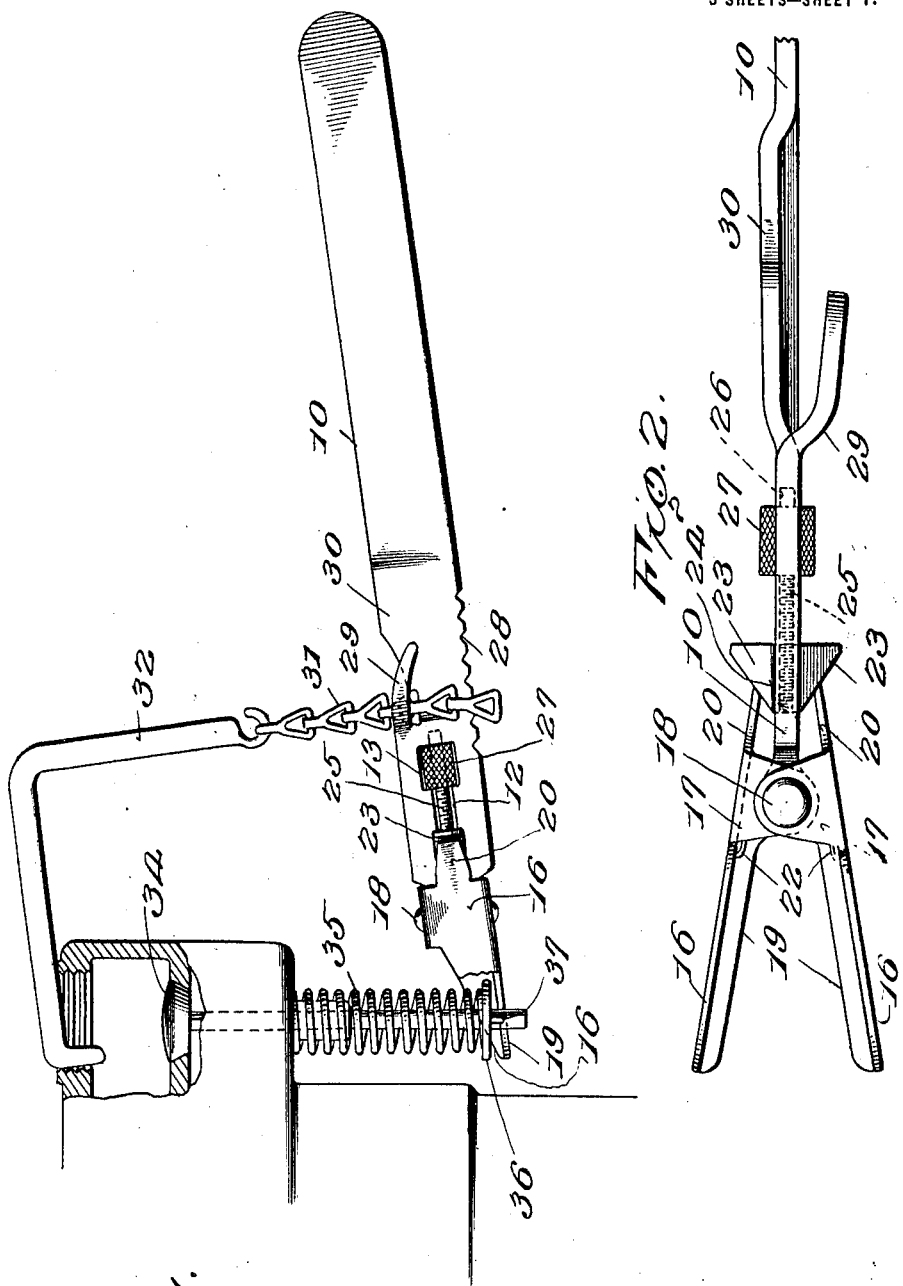

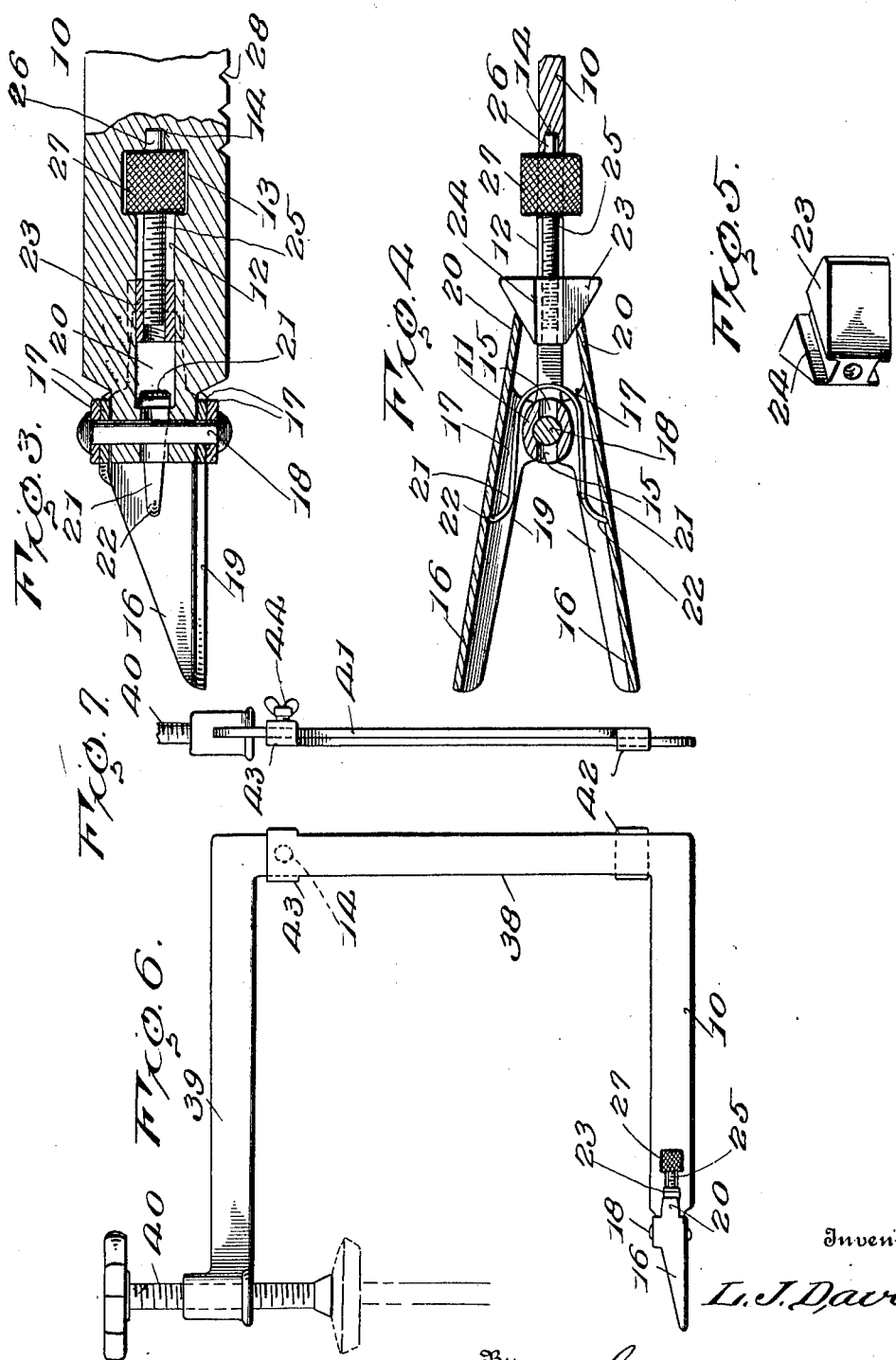

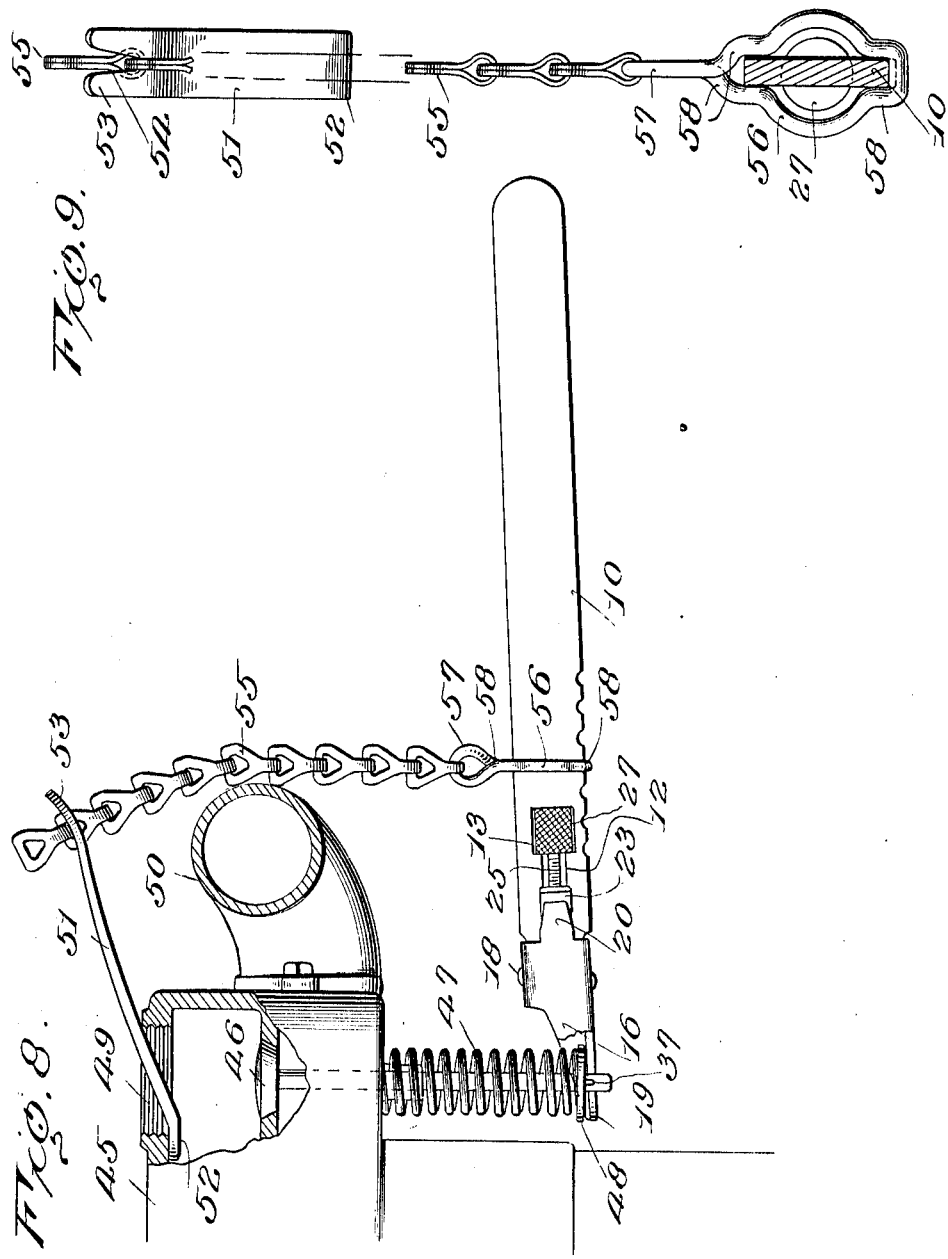

LLEWELYN J. DAVIES, OF MEDFORD, OREGON.

VALVE-SPRING LIFTER.

1,311,805.  Specification of Letters Patent.  Patented July 29, 1919.

Application filed May 7, 1918. Serial No. 233,126.

*To all whom it may concern:*

Be it known that I, LLEWELYN J. DAVIES, a citizen of the United States, residing at Medford, in the county of Jackson and State of Oregon, have invented certain new and useful Improvements in Valve-Spring Lifters, of which the following is a specification.

This invention relates to an improved valve spring lifter for internal combustion engines and has as its primary object to provide a device of this character which may be readily engaged with the retaining washer for the valve spring and actuated for compressing the spring so that the stop pin for the said washer may be readily removed from the valve stem and the valve spring thus displaced to permit the removal of the valve.

The invention has as a further object to provide a construction wherein the lifter will be equipped with coacting jaws adapted to engage the valve stem washer and wherein the said jaws may be readily adjusted for receiving washers of different diameters so that the tool will thus be adapted for a wide range of use.

And the invention has as a still further object to provide a simple and effective adjusting means for the jaws of the device.

Other and incidental objects will appear as the description proceeds. In the drawings wherein I have illustrated the preferred embodiment of the invention, and wherein similar reference characters designate corresponding parts throughout the several views:

Figure 1 is a side elevation showing the use of my improved tool in connection with a conventional type of internal combustion engine valve, Fig. 2 is a fragmentary plan view of the device, Fig. 3, is a fragmentary section more particularly illustrating the mounting of the jaws of the device, Fig. 4 is a fragmentary sectional view taken at right angles to Fig. 3 and particularly illustrating the mounting of the spreading spring of the jaws as well as the mounting of the wedge block employed for adjusting the jaws with respect to each other, Fig. 5 is a detail perspective view showing the wedge block detached, Fig. 6 is a side elevation showing a slightly modified form of the invention, Fig. 7 is a fragmentary end elevation showing the adjustable connection of the clamp arms of the modified structure, Fig. 8 is a fragmentary side elevation showing a modified form of suspension means for my improved tool, and Fig. 9 is an elevation with the body bar of the tool shown in section, this view particularly showing the suspension loop employed in connection with this latter modification.

In carrying out the invention I employ a body bar 10 at one end of which is formed a reduced ovate head 11 and extending medially of the bar at the rear of this head is a longitudinally extending slot 12 opening, at its inner end, into a recess 13 in the bar. The rear wall of this recess is formed axially of the said slot with a socket 14 while the head 11 is also preferably formed axially of the slot with alined transverse lubricant receiving openings 15. Mounted to swing upon the head 11 are coacting work engaging jaws 16 provided at their inner ends with mating ears or pivot lugs 17 embracing the head 11 and pivotally connected thereto by a suitable pivot pin 18 journaled through the head. In advance of the ears 17, the upper edges of the jaws are cut away so that the jaws thus taper toward their outer ends and formed on the lower edges of the jaws to extend forwardly from the said ears are inwardly directed work receiving lips or flanges 19 extending laterally between the jaws. Formed on the rear ends of the jaws medially thereof, are confronting longitudinally extending arms or lugs 20 which, as particularly shown in Fig. 4 of the drawings, are provided with beveled inner end edges. Embracing the head 11 of the body bar and disposed between the jaws 16 is a spreader spring 21 for the said jaws. This spring is preferably formed from a suitable piece of resilient sheet metal bowed into substantially U-shape and inserted through the inner end of the slot 12 of the body bar to extend around the head 11. At its free extremities the spring is formed with outwardly bowed reduced terminals 22, engaging within suitable oppositely disposed sockets in the inner faces of the jaws for thus removably connecting the said spring with the jaws and holding the spring against accidental displacement. As will be seen, this spring will constantly tend to spread the outer ends of the jaws and consequently urge the arms 20 thereof toward each other. Mounted upon the body bar 10 is an adjusting means for the jaws. This adjusting means includes a wedge block 23 which is provided upon opposite sides thereof with longitudinal extending slots or grooves 24 and is insertible through the recess 13 in the body bar to slidably fit within the slot 12, the edges of the bar, at opposite sides of said slot engaging within the grooves 24 of the wedge block for connecting the block with the bar and slidably supporting the said block for movement longitudinally of the slot. Threaded through the wedge block axially thereof is an adjusting screw 25 which extends medially through the slot 12 and across the recess 13. At its inner end this adjusting screw is formed with a reduced trunnion 26 journaled in the socket 14 of the body bar for thus rotatably supporting the said screw at its inner end and formed on the screw or otherwise secured thereto to be loosely received within the recess 13 of the body bar is a cylindrical adjusting nut 27, the peripheral face of which is preferably milled so that the said nut may be readily grasped for rotating the adjusting screw. As particularly brought out in Figs. 2 and 4 of the drawings, the beveled outer end edges of the arms 20 of the jaws 16 are formed to coact with the inclined faces of the wedge block 23 so that, as will now be seen, the nut 27 of the adjusting screw 25 may be rotated for turning this screw and accordingly adjusting the wedge block longitudinally of the slot 12 of the body bar with respect to the said arms. Upon the outward movement of the wedge block within the slot, the arms 20 of the jaws will be separated so that the said jaws will be swung inwardly toward each other against the tension of the spring 21 while inward movement of the wedge block will permit the spreading of the jaws under the influence of the said spring. The jaws may thus be quickly and easily adjusted with respect to each other.

Formed in the bottom edge of the body bar 10 in the rear of the slot therein, is a series of longitudinally spaced notches 28 so that the bar may be readily engaged with a suitable support therefor and fulcrumed upon the said support without slipping. However, it is sometimes found necessary to pivot the bar from a point thereabove and I have accordingly formed the bar in the rear of the adjusting nut 27, with a pivot hook 29. This hook is preferably struck from the upper edge of the bar and is offset at its inner extremity to extend in laterally spaced relation thereto while the bar itself beneath the hook is formed with an offset portion 30 directed away from the hook. Clearance is thus provided between the hook and the bar for receiving the free extremity of a suitable suspension chain 31, the links of which may be selectively arranged crosswise beneath the hook for thus adjustably connecting the chain with the hook. Engaged with the said chain is a substantially L-shaped suspension hook 32. This suspension hook is designed for engagement with the upper end of an engine cylinder for supporting the body bar 10 therefrom and in Fig. 1 of the drawings I have shown my improved device in connection with such a cylinder, in order to clearly bring out its use. In this figure an internal combustion engine cylinder is conventionally shown at 33 and one of the valves of the cylinder at 34. Surrounding the stem of this valve is a valve spring 35 seating at its lower end against a retaining washer 36 surrounding the valve stem and held against displacement by a pin or key 37 removably fitted through the stem. As is usual, the upper wall of the chamber for the valve is provided with a suitable opening through which the valve may be removed, and, as will now be seen, the free end of the suspension hook 32 is engaged within this opening. The body bar 10 is then connected by its hook 29 with the chain 31 and adjusted upon the chain so that the jaws 16 may, as illustrated in this figure, be engaged with the washer 36 of the valve spring. In this connection it is to be noted that the said jaws are fitted around the washer to engage the jaw flanges 19 thereunder and, as will be seen in view of the preceding description, the said jaws may be readily adjusted with respect to each other for receiving the washer therebetween. This adjustability of the jaws provides an arrangement wherein the jaws may not only be moved to grip the washer, if desired, but may be adjustably positioned for receiving washers of various diameters. My improved tool is thus adapted for a wide range of use. Furthermore, the swinging jaws and their adjusting mechanism as exemplified in the present invention, may be incorporated into the construction of various types of valve spring lifters now in use for rendering such conventional lifters more efficient and convenient. Upon the engagement of the jaws with the washer 36, the body bar 10 may then be grasped, when by pressing downwardly upon the outer end of said bar, the spring 35 may be compressed and the pin 37 then easily removed to permit removal of the washer, valve spring, and the valve. In any instance where it is possible to rest the lower edge of the bar at the notches 28 upon some convenient support therefor, for rocking the bar to compress the spring 35, the suspension hook 32 with its chain need not be used.

In Figs. 6 and 7 of the drawings I have illustrated a slight modification of the invention wherein the body bar 10 of the device is formed at its outer end with an angularly disposed arm 38 to provide one section of a supporting clamp for the bar. A mating clamp section is indicated at 39 and is formed with angularly disposed arms, one of which confronts the body bar 10 and is provided at its outer end with a clamping screw 40. The other arm 41 of this clamp section overlies the arm 38 of the body bar and is provided at its outer end with a loop 42 slidably receiving the latter arm. Formed on the outer end of the arm 38 is a similar loop 43 slidably receiving the arm 41 and threaded upon this loop to engage the said arm is a set screw 44. As will be seen in view of the preceding description, the screw 44 may be operated to permit the adjustment of the sections of the clamp upon each other so that the jaws of the body bar 10 may be engaged with a valve stem washer, and the clamping screw 40 inserted through the opening in the cylinder head above the valve and engaged with the valve. Then, when the screw 44 is set to rigidly connect the sections of the clamp, the screw 40 may be operated for compressing the valve spring. In some instances the use of this clamp may, therefore, be found highly desirable.

In Figs. 8 and 9 of the drawings, I have illustrated a modified form of suspension means for my improved tool. In Fig. 8 a portion of an engine cylinder is conventionally shown at 45, one of the valves of the cylinder at 46, the valve spring at 47 and the retaining washer for the said spring at 48. Formed through the wall of this cylinder above the valve is the usual opening 49. A branch of the manifold leading to the cylinder is indicated at 50. The valve spring lifter shown in this figure as well as Fig. 9, is substantially identical with the construction of the preferred form of the invention and similar reference characters have, therefore, been used to designate the parts thereof. Coming now more particularly to the subject of the present modification, I employ a suspension bar 51 adapted to be fitted through the opening 49 of the engine cylinder and provided at its inner end with an obliquely directed terminal or toe 52 adapted to engage beneath the wall of the cylinder for supporting the bar to project at its outer extremity laterally from the cylinder over the manifold branch 50. At its outer end the bar is formed with a laterally curved terminal 53 in which is formed, as particularly shown in Fig. 9, a longitudinally extending slot 54 opening through the adjacent end of the bar. Adjustably engaged in the slot 54 is a suspension chain 55 to the lower end of which is connected a suspension loop 56. This loop at its upper end is given a half turn to provide an eye 57 receiving the adjacent terminal link of the chain 55 and the sides of the loop are, as also particularly shown in Fig. 9, bent to provide at the top and bottom of the loop, substantially U-shaped guide members 58 slidably receiving the upper and lower edges of the body bar 10 of the device snugly therein. The said body bar will thus be prevented from pivoting or rocking within the loop so that the jaws thereof may be engaged beneath the retaining washer 48 for the valve spring and the bar pivoted upon the loop for lifting the spring so that the said washer may be displaced and the spring thus removed. This modified form of suspension means for the tool thus provides a very simple and convenient arrangement.

Having thus described the invention, what is claimed as new is:

1. A valve spring lifter including a body bar provided with a head, coacting work engaging jaws pivoted upon the head, a spring bowed around the rear side of the head to extend between the jaws and tending to spread the jaws, the head holding the spring against disengagement from the jaws transversely thereof as well as displacement forwardly between the jaws, and means upon the body bar for shifting the jaws toward each other.

2. A valve spring lifter including a body bar, coacting work engaging jaws pivoted thereon, arms projecting from the jaws at their inner end edges, and means shiftable upon the bar and engaging between the arms for positioning the jaws toward each other.

3. A valve spring lifter including a body bar provided with an opening, coacting work engaging jaws pivoted upon the bar, yieldable means extending through said opening to engage between the jaws and constantly tending to spread the jaws, and means adjustable upon the bar for swinging the jaws toward each other.

4. A valve spring lifter including a body bar formed at its inner end with a head and provided with a longitudinal slot in the rear of the head, coacting work engaging jaws provided with inwardly directed lugs mating at opposite ends of the head, a pivot pin extending through the head and said lugs and swingingly connecting the jaws with the head, the jaws at their inner end edges being provided with rearwardly projecting arms extending at opposite sides of the body bar, means slidable in said slot and engaging between the arms for adjusting the outer ends of the jaws toward each other, and yieldable means fitted through said slot to extend around the head and engage between the jaws for spreading the jaws.

5. A valve spring lifter including a body bar provided adjacent its inner end with a longitudinally extending slot, coacting work engaging jaws swingingly mounted upon the inner end of the bar and provided with rearwardly projecting arms extending at opposite sides of the bar, a wedge block slidable in said slot and provided with grooves receiving the walls of opposite slot, and means for shifting the wedge block to engage between said arms for shifting the outer ends of the jaws toward each other.

In testimony whereof I affix my signature.

LLEWELYN J. DAVIES. [L. S.]

Copies of this patent may be obtained for five cents each, by addressing the "Commissioner of Patents, Washington, D. C."